United States Patent [19]

Brausfeld et al.

[11] Patent Number: 4,630,800
[45] Date of Patent: Dec. 23, 1986

[54] SEALING ARRANGEMENT FOR A SLIDE VALVE

[75] Inventors: Walter Brausfeld, Hanover; Ernst-August Meyer, Algermissen, both of Fed. Rep. of Germany

[73] Assignee: WABCO Westinghouse Steuerungstechnik GmbH & Co., Hanover, Fed. Rep. of Germany

[21] Appl. No.: 828,926

[22] Filed: Feb. 12, 1986

[30] Foreign Application Priority Data

Feb. 14, 1985 [DE] Fed. Rep. of Germany ....... 3505046

[51] Int. Cl.$^4$ .............................................. F16K 11/07
[52] U.S. Cl. .................................... 251/324; 251/363; 137/625.69
[58] Field of Search ............... 251/324, 325, 361, 363; 137/625.69

[56] References Cited

U.S. PATENT DOCUMENTS 3,199,540  8/1965  Forster ........................... 251/324 X
3,969,924  7/1976  Grove ............................. 251/324 X
4,491,155  1/1985  Meyer et al. .................... 251/324 X

FOREIGN PATENT DOCUMENTS 1196956  6/1959  France ................................ 251/324

Primary Examiner—Arnold Rosenthal
Attorney, Agent, or Firm—J. B. Sotak

[57] ABSTRACT

A sealing arrangement, which can be inserted into a recess formed in a valve housing, to effectively provide a fluid pressure seal between at least one input chamber and one output chamber, and in which a slide piston is movably-disposed in the recess. The sealing arrangement includes a first gasket and a second gasket, which are disposed in coaxial relationship to one another, and which are concentric to the recess of the valve housing. The two gaskets are connected to one another by means of elastic annular connecting pieces. The connecting pieces of the two gaskets are located between a plurality of apertured retaining elements, which have a portion of the end surfaces of projections in contact with the connecting pieces. A plurality of rivet members pass through the apertured retaining elements and the connection pieces to hold them in the form of a sealing cartridge.

7 Claims, 1 Drawing Figure

U.S. Patent    Dec. 23, 1986    4,630,800
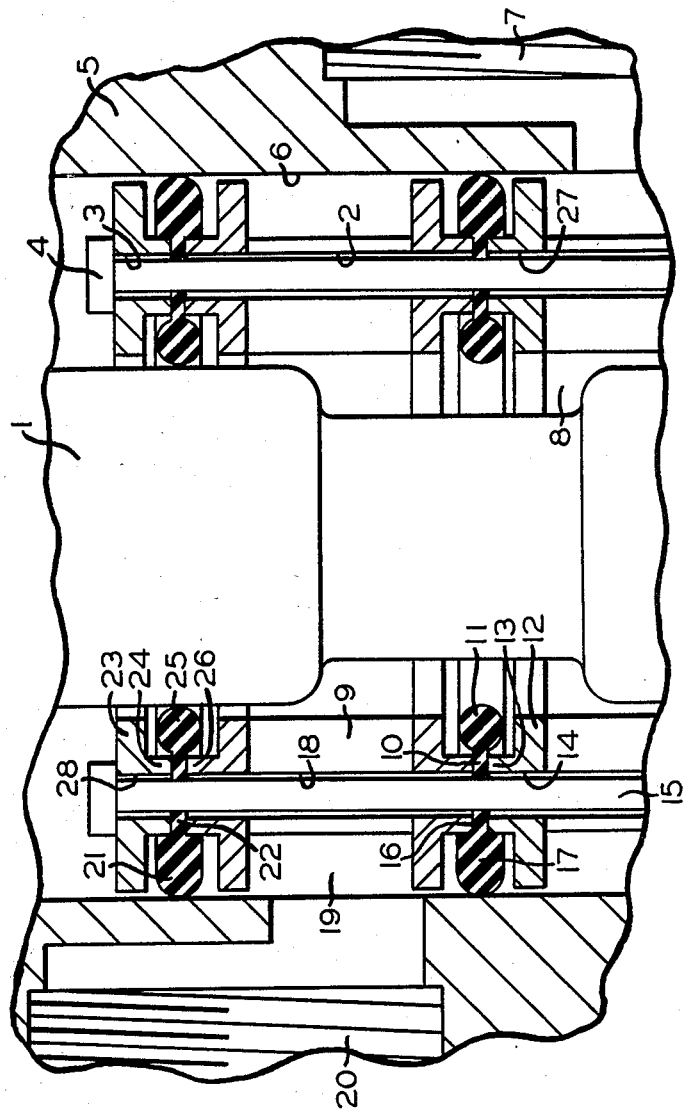

SEALING ARRANGEMENT FOR A SLIDE VALVE

FIELD OF THE INVENTION

This invention relates to a sealing arrangement, which is inserted into a cylindrical recess of a valve housing, to provide an effective seal between a pair of chambers defined by the cylinder housing and a movable piston member of a slide valve assembly.

BACKGROUND OF THE INVENTION

It will be appreciated that numerous types of sealing arrangements have been previously devised for a slide valve, such as, that shown and disclosed in U.S. Pat. No. 4,491,155. Another previous valve sealing arrangement is shown and disclosed in the published German Patent Application DE OS 14 25 580.

This prior sealing arrangement consisted of a first gasket and a second gasket, which are disposed in coaxial relationship to one another. It will be seen that, situated between the two gaskets, is a connecting member which serves as a support ring for the two gaskets, and which is connected to each of the respective gaskets. The gaskets are connected with the support ring, and are held in the recess of a valve housing by annular retaining elements, which also serve as spacer members. The support ring and the retaining elements are designed and arranged in relation to one another, so that the surfaces of the retaining elements face one another. A portion of their surfaces are in contact, each with one side of the support ring. Thus, the support ring lies between, and is held in place by the retaining elements. The support rings and retaining elements are designed, in relation to their axial extension, so that they can be held in their position by the covers closing the recess of the housing. When this previous known type of arrangement is compared to a sealing arrangement, in which the gaskets are not connected with one another or with the support ring, it has been found to have the advantage that when a part which can move inside the housing, for example, a valve slide, moves past the gasket, no twisting movement is imparted to the gaskets, and they are not torn out of their grooves.

However, with regard to assembly and manufacture, the sealing arrangement has various disadvantages. The individual parts of the sealing arrangement, such as, the gaskets with the support rings and the retaining elements, must be individually-installed in the bore or recess of the housing. The close tolerances and allowances must be complied with, in order to minimize axial play of the sealing arrangement within the recess of the housing boring. The compound parts, such as, the gaskets with the connecting pieces, which serve as support rings, are usually relatively expensive and difficult to manufacture.

OBJECTS AND SUMMARY OF THE INVENTION

Accordingly, it is an object of this invention to provide an improved sealing arrangement, of the type described above, which is simple in design and relatively easy to install.

A further object of this invention is to provide a sealing arrangement, which can be located in a recess formed in a valve housing, to establish a seal between at least two fluid chambers formed in the valve housing, and having a movable member which moves in the recess, comprising:

(a) a first gasket and a second gasket, which are located in coaxial relationship with one another, and concentric with the recess of the housing;

(b) the first gasket and the second gasket are connected to one another by an annular connecting piece;

(c) the first and second gaskets are fixed in the recess of the housing by ring-shaped retaining elements, which are in contact with a portion of the end surfaces on each side of the connecting pieces of said first and second gaskets, which are located between the retaining elements;

(d) the connecting pieces consist of an elastic material;

(e) the connecting pieces being designed to be thinner in the axial direction, along the length of the recess, than the gaskets; and (f) means for interconnecting the retaining elements with one another, and with the connecting pieces which pierce the connecting pieces.

The invention has the added advantage that, during assembly, the rubber connecting pieces can be quickly and easily pierced by the connecting elements, which are designed as pointed rivets or headed bolts. Thus, the peripheral areas of the passageways, created in this manner in the connecting pieces, are always in a tight contact with the connecting elements. Accordingly, the retaining elements and the sealing rings are combined to form a sealing cartridge for a fluid pressure slide valve assembly. The sealing cartridge is installed into the recess of a valve housing, for example, a slide valve housing. The individual components of the sealing arrangement or sealing cartridge are securely held together by rivets, so that the parts can no longer move in relation to one another. The connecting pieces for the two gaskets, which preferably are designed as ring washers, are made of an elastic material which is relatively easy to pierce or penetrate. Thus, it is not necessary to make special openings in the connecting pieces, as a separate work operation. In addition, it is not necessary, during assembly, to establish any special orientation of the two gaskets in relation to each other and to the retaining elements, since the connecting pieces can be pierced at any desired location by means of the pointed rivets. The connecting pieces can advantageously consist of the same material as the gaskets, and are designed to be relatively thin so there is substantially no increase in the radial pressure due to axial prestressing. Nevertheless, the two gaskets are securely held in place. There is no need for a special support ring for the seal elements, since the gaskets are captured in annular radial slots, which are formed by lateral projections of the retaining elements. The connecting pieces prevent any twisting or excursion of the gaskets out of the slots.

BRIEF DESCRIPTION OF THE DRAWING

The above objects and other attendant features and advantages of the present invention will become more readily understood, from the following description, when considered in conjunction with the accompanying drawing, wherein:

The single FIGURE is a cross-sectional view of a slide valve, in which a sealing arrangement is designed as a sealing cartridge in accordance with the present invention.

DETAILED DESCRIPTION OF THE INVENTION

As shown in the single FIGURE of the drawing, there is illustrated a valve housing 5, which includes a fluid pressure inlet port or connection 7 and a fluid pressure outlet port or connection 20. The housing includes a recess or bore 6, for receiving a valve slide or spool 1 and a sealing cartridge. The sealing cartridge is located between the inner wall of the recess 6 of the valve housing and the valve slide 1. As shown, the valve slide 1 may assume a position in which an inlet chamber 8 is connected with the fluid pressure inlet port or connection 7. The inlet chamber 8 is shown in communication with the outlet chanmber 19, which is connected with the fluid pressure outlet port or connection 20.

The sealing arrangement consists of a first inner gasket or sealing ring 11, 25, respectively; and a second outer gasket or sealing ring 17, 21, respectively. The respective sealing gaskets are located in coaxial relationship, and are held in place by three annular retaining elements 12, 9, and 23. The gaskets 11, 17 and the sealing rings 25, 21 are securely-connected to one another by means of an annular connecting piece 16, 22, preferably designed as a membrane or diaphragm, and therefore form a first double-seal 11, 17, 16 and a second double-seal 25, 21, 22. The first retaining element 12, on its side facing the first double-seal 11, 17, 16, includes a circular or upstanding collar projection 13, the end surface of which is designed so that it is covered by the annular surface of the annular diaphragm connecting piece 16 of the first double seal 11,17, 16. It is also possible, however, to make the projections more narrow than the annular surfaces of the connecting pieces, so that the entire width of the annular surfaces of the connecting pieces is not supported by the end surfaces of the projections. This results in a greater freedom of movement of gaskets or seals. The second retaining element 9, opposite the first retaining element 12 has, on its side facing the first double-seal 11, 17, 16, another circular projection or lower depending collar 10, whose end surface is designed so that it is covered with the annular surface of the connecting piece 16. On the side of the second retaining element 9, facing away from the first double-seal 11, 17, 16, there is another circular projection or annular upstanding collar 26, with which the second double-seal 25, 21, 22 is in contact by means of its diaphragm connecting piece 22. The third retaining element 23 is located opposite the second retaining element 9 on the other side of the second double-seal 25, 21, 22, and is in contact with the end surface of a circular projection or annular depending collar 24 on the connecting piece 22 of the second double-seal 25, 21, 22, extending to the second double-seal 25, 21, 22. As a result of the annular projections 13, 10, 26, 24 provided on the retaining elements 12, 9, 23, there are graduations which, when the retaining elements 12, 9, 23 are connected with one another and with the double-seals 11, 17, 16 or 25, 21, 22, form annular grooves to house and retain the gaskets or seals 11, 17, 25, 21 of the double-seals 11, 17, 16 or 25, 21, 22.

Extending along the longitudinal axis of the valve and the retaining elements 12, 9, 23, are a plurality of circular aligned holes 14, 18, 28 and 3, 2, 27, respectively; through which, two connecting elements 15, 4, which may take the form of pointed rivets or headed bolts, are placed. The matching holes, which are required in the connecting pieces 16, 22 of the double-seals 11, 17, 16 and 25, 21, 22 for accepting the rivets 15, 4, are not a separately-created work-step, but may be made by the ends of the rivets 15, 4 when the rivets 15, 4 are inserted into the aligned holes 14, 18, 28, 3, 2, 27 of the retaining elements 12, 9, 23. The peripheral surfaces of the connecting pieces 16, 22, adjoining the holes, are thereby in intimate and tight contact with the rivets 15, 4.

It will be appreciated that the sealing equipment of the subject invention can consist of as many double-seals and retaining elements as desired. In its simplest embodiment, the sealing arrangement consists of two retaining elements and one double-seal. The connecting elements can also be designed in the form of snap-connections, which, for example, consists of a male portion on one retaining element, and a corresponding matching female portion on the other retaining element. The male portion should be designed with a somewhat sharp point, so that when the retaining elements are joined together, it can pierce the connecting pieces of the double-seal.

It will be understood that circular seal shoulders can be formed on the end mating surfaces of the projections 13, 10, 26, 24 of the retaining elements 12, 9, 23 in the circumferential direction, so that when the sealing cartridge is assembled, the shoulders are pressed against the connecting piece 16 or 22 of the double-seal 11, 17, 16 or 25, 21, 22, and thus create an increased sealing effect in the vicinity of the passages 14, 18, 28, 3, 2, 27 for the connecting elements 15, 4.

It will be appreciated that in the preferred embodiment, the passageways or through holes in the retaining elements 12, 9, 23 may be selected to have a diameter which is smaller or larger than the diameter of the connecting elements 15, 4 and the connecting pieces 16, 22. The retaining elements 12, 9, 23 can also be designed as cylindrical-shaped members, which consist of individual circular segments arranged in the form of a ring.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents, and substitutions for components of the above specifically-described embodiment of the invention may be made by those skilled in the art without departing from the spirit and scope of the invention as set forth in the appended claims.

We claim:

1. A sealing arrangement, which can be located in a recess formed in a valve housing, to establish a seal between at least two fluid chambers formed in the valve housing, and having a movable member which moves in the recess, comprising:
    (a) a first gasket and a second gasket, which are located in coaxial relationship with one another, and concentric with the recess of the housing;
    (b) the first gasket and the second gasket are connected to one another by an annular connecting piece;
    (c) the first and second gaskets are fixed in the recess of the housing by ring-shaped retaining elements, which are in contact with a portion of the end surfaces on each side of the connecting pieces of said first and second gaskets, which are located between the retaining elements;

(d) the connecting pieces consist of an elastic material;

(e) the connecting pieces being designed to be thinner in the axial direction, along the length of the recess, than the gaskets; and (f) means for interconnecting the retaining elements with one another, and with the connecting pieces which pierce the connecting pieces.

2. The sealing arrangement, according to claim 1, wherein the means for interconnecting the retaining elements with one another and with the connecting pieces are pointed rivets.

3. The sealing arrangement, according to claim 1, wherein the connecting pieces for the first and second gaskets are designed as a diaphragm.

4. The sealing arrangement, according to claim 1, wherein the portions of the connecting pieces located between the first and second gaskets are holeless, prior to the establishment of the seal, so that the alignment of the retaining elements and the connecting pieces is readily achieved, and corresponding holes of the connecting pieces have a diameter smaller than the diameter of the holes of the connecting elements (pointed rivets).

5. The sealing arrangement, according to claim 1, wherein retaining elements include circular projections, which face each other, and are in contact with the connecting pieces so that the circular projections form a groove base of a groove to hold the first and second gaskets.

6. The sealing arrangement, according to claim 1, wherein the means to connect the retaining elements with one another and with the connecting piece, includes a male portion, located on the one retaining element; and a corresponding female portion, located on the other retaining element, into which the male portion can be plugged.

7. The sealing arrangement, according to claim 1, wherein circular seal shoulders are located on a portion of the end surfaces of the retaining elements to provide a tight contact with the connecting pieces.

* * * * *